US007236939B2

(12) United States Patent
Chen et al.

(10) Patent No.: US 7,236,939 B2
(45) Date of Patent: Jun. 26, 2007

(54) PEER-TO-PEER INTER-ENTERPRISE COLLABORATIVE PROCESS MANAGEMENT METHOD AND SYSTEM

(75) Inventors: Qiming Chen, Sunnyvale, CA (US); Meichun Hsu, Los Altos Hills, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 965 days.

(21) Appl. No.: 09/823,581

(22) Filed: Mar. 31, 2001

(65) Prior Publication Data

US 2002/0184070 A1 Dec. 5, 2002

(51) Int. Cl.
*G06F 9/46* (2006.01)

(52) U.S. Cl. .......................................................... 705/9

(58) Field of Classification Search ..................... 705/9
See application file for complete search history.

(56) References Cited

U.S. PATENT DOCUMENTS

| | | | | |
|---|---|---|---|---|
| 5,734,837 | A * | 3/1998 | Flores et al. | 705/8 |
| 5,822,585 | A * | 10/1998 | Noble et al. | 719/316 |
| 5,826,239 | A * | 10/1998 | Du et al. | 705/8 |
| 5,878,206 | A * | 3/1999 | Chen et al. | 714/19 |
| 5,937,388 | A * | 8/1999 | Davis et al. | 705/8 |
| 5,960,404 | A * | 9/1999 | Chaar et al. | 705/8 |
| 6,035,399 | A * | 3/2000 | Klemba et al. | 726/1 |
| 6,119,149 | A * | 9/2000 | Notani | 709/205 |
| 6,332,155 | B1 * | 12/2001 | Notani | 709/205 |
| 6,339,832 | B1 * | 1/2002 | Bowman-Amuah | 714/35 |
| 6,397,191 | B1 * | 5/2002 | Notani et al. | 705/9 |
| 6,449,646 | B1 * | 9/2002 | Sikora et al. | 709/226 |
| 6,519,642 | B1 * | 2/2003 | Olsen et al. | 709/227 |
| 6,647,420 | B2 * | 11/2003 | Hellbusch et al. | 709/226 |
| 6,678,882 | B1 * | 1/2004 | Hurley et al. | 717/121 |
| 6,691,151 | B1 * | 2/2004 | Cheyer et al. | 709/202 |
| 6,983,395 | B2 * | 1/2006 | Chen et al. | 714/4 |
| 2001/0039570 | A1 * | 11/2001 | Stewart et al. | 709/205 |
| 2002/0138287 | A1 * | 9/2002 | Chen et al. | 705/1 |
| 2002/0178395 | A1 * | 11/2002 | Chen et al. | 714/2 |
| 2003/0061330 | A1 * | 3/2003 | Frisco et al. | 709/223 |
| 2004/0078373 | A1 * | 4/2004 | Ghoneimy et al. | 707/10 |

FOREIGN PATENT DOCUMENTS

EP 0954799 B1 * 8/2001

OTHER PUBLICATIONS

Munindar P. Singh et al., Multiagent Systems for Workflow International Journal of Intelligent Systems in Accounting, Finance and Management, vol. 8, 1999, pp. 105-117.*

(Continued)

*Primary Examiner*—C. Michelle Tarae
*Assistant Examiner*—Scott L. Jarrett

(57) ABSTRACT

A collaborative business process for modeling inter-enterprise collaboration (e.g., peer-to-peer (P2P) or business-to-business (B2B) interaction) that involves at least two players from two different enterprises is defined. The collaborative business process has a plurality of work nodes. Each work node has a task-role identifier for identifying a particular player to execute each node. A first collaborative process manager (FCPM) associated with the first player is provided to execute a first instance of the collaborative business process. A second collaborative process manager (SCPM) associated with the second player is provided to execute a second instance of the collaborative business process.

9 Claims, 8 Drawing Sheets

OTHER PUBLICATIONS

Feng Wan et al., Multiagent Workflow Management IJCAI Workshop on Intelligent Workflow and Process Management: The New Frontier for AI in Business Aug. 1999.*

Merz, Michael et al., Using Mobile Agents to Support Interoganizational Workflow-Management International Journal on Applied Artificial Intelligence, 11(6), Sep. 1997, S. 551ff.*

Huhns, Michael, Agent Foundations for Cooperative Information Systems Third International Conference on the Practical Application of Intelligent Agents and Multi-Agent Technology, Mar. 1998.*

Shepherdson J.W., et al., Decentralised workflows and software agents BTTJ vol. 17 No. 4, Oct. 1999.*

Odgers B.R. et al., Technologies for Intelligent Workflows: Experiences and Lessons Proceedings of Agent-Based Systems in the Business Context, /AAAI 1999 Workshop, Jul. 19, 1999.*

Odgers B.R. et al., Distributed Workflow Co-ordination by Proactive Software Agents Proceedings of Intelligent Workflow and Process Management, IJCAI-99 Workshop, Aug. 1999.*

Collins P. et al., Processual Management Using Intelligent Workflow Systems Proceedings of 5th International Conference of the Decision Sciences Institute, Jul. 1999.*

Shepherdson J.W. et al., Cross Organisational Workflow Co-ordinated by Software Agents WACC '99 (Work Activity Coordination and Collaboration) Workshop Paper, Feb. 1999.*

O'Brien P.D. et al., Agent based process management : applying intelligent agents to workflow Knowledge Engineering Review, vol. 13:2, Sep. 1998.*

Jennings N. et al., Designing and Implementing A Multi-Agent Architecture for Business Process Management European Conference on Artificial Intelligence'96 Workshop on Agents Theories, Architecture and Languages, 1996.*

Jennings, N.R., Using Intelligent Agents to Manage Business Processes First International Conference on The Practical Application of Intelligent Agents and Multi-Agent Technology, 1996, pp. 345-360.*

Gang Wu et al., A Novel Workflow Management Model Based on Mobile Agents for Internet Electronic Commerce IEEE, 2000.*

Huhns, Michael et al., Workflow Agents IEEE Internet Computing, Jul.-Aug. 1998.*

The evolution of business processes from description to data to smart executable code CSC Research Services, Mar. 2001.*

Chen, Qiming, Dynamic-Agents, Workflow and XML for E-Commernce Automation Proceedings of the First International Conference on Electronic Commerce and Web Technologies, 2000, pp. 314-323.*

Qiming, Chen, Multi-Agent Cooperation, Dynamic Workflow and XML for E-Commerce HP Labs, Oct. 1999.*

Glushko, Robert J. et al., An XML Frameworkf for Agent-based E-Commerce Communications of the ACM, Mar. 1999, vol. 42, No. 3, pp. 106-114.*

Jonker, Wilem et al., Workflow Management Systems and Cross-Organizational Logistics Proceedings of the WACC Workshop on Cross-Organisational Workflow Management and Co-Ordination, 1999.*

Alty, J. A. et al., ADEPT—Advanced Decision Environment for Process Tasks: Overview & Architecture, 1994, BCS Expert Systems Conference, pp. 359-371.*

Klusch, Matthias; Intelligent Information Agents Springer, 1999, ISBN: 3-540-65112-8.*

Weiss, Gerhard, Multiagent Systems: A Modern Approach to Distributed Artifical Intelligence MIT Press, 1999, ISBN: 0-262-23203-0.*

P. Johannesson, B. Wangler, and P. Jayaweera, "Application and Process Integration—Concepts, Issues, and Research Directions", Information Systems Engineering Symposium 2000, eds. S. Brinkkemper, E. Lindencrona, and A. Sölvberg, Springer Verlag, 2000.*

Johannesson, P., A Process Broker Architecture for Systems Integration Oct. 1999.*

Qiming, Chen et al., Inter-Enterprise Collaborative Business Process Management Aug. 17, 2000, HP Laboratories.*

Qiming, Chen et al., How Agents from Different E-Commerce Enterprises Cooperate Aug. 17, 2000, HP Laboratories.*

Orfali, Robert et al., Client/Server Survival Guide Third Edition John Wiley & Sons, 1999, ISBN: 0-471-31615-6, pp. 157-177, 341-346, 447-503, 616-617.*

H.M. Dietel et al., How to Program Java, Fourth Edition Prentice Hall, 2002, ISBN: 0-13-034151-7, pp. 274-275, 394-399, 805-832, 1113-1115.*

Atluri, Vijayalakshmi et al., Enforcing Mandatory and Discretionary Security in Workflow Management Systems Proceedings of the 10th IFIP Working Conference on Database Security, Jul. 1996.*

Merz, M. et al., Interorganizational Workflow Management with Mobile Agents in COSM Conference on the Practical Application of Agents and Multi-Ageny Systems, PAAM'96, 1996.*

Sladek, Aija et al., Modeling Inter-Organizational Workflows Proceedings International Symposium on Applied Corporate Computing, ISACC'96, Oct. 1996.*

Chen, Qiming et al., Dynamic-Agents for Dynamic Service Provisioning IEEE Computer Society, Aug. 1998.*

Hiramatsu, Keiko et al., Interworkflow System: Coordination of Each Workflow System Among Multiple Organizations Third International Conference of Cooperative Information Systems, 1998.*

Sturim, Robert, Achieving Competitive Advantage through Supply Chain Integration Vitria Technology, Inc., 1999.*

Anderson, Mike et al., Workflow Interoperability—Enabling E-Commerce WFMC.org, Apr. 1, 1999.* eBusiness: Extending the Enterprise Vitria Technology, Inc. 1999, Retrieved from Archive.org Mar. 21, 2006.*

Atwood, Richard, Bringing Process Automation to Bear on the Task of Business Integration Patricia Seybold Group, May 19, 1999.*

Schulz, Karsten et al., Architecting Cross-Organizational B2B Interactions Conference on Enterprise Distributed Object Computing, 2000.*

Lazcano, A. et al., The WISE approach to Electronic Commerce International Journal of Computer Systems Science & Engineering, May 26, 2000.*

Workflow Management Coalition Workflow Standard—Interoperability Internet e-mail Binding The Workflow Management Coalition, Jul. 1998.*

Jennings, N.R. et al., Autonomous Agents for Business Process Management Applied Artificial Intelligence, vol. 14, No. 145, 2000.*

Bergelin, Joakim, Business Process Integration Methodology—A Study RosettaNet 2000.*

Vitiria.com Web Pages Vitria Technology, Inc., Sep.-Dec. 2000, Retrieved from Archive.org Mar. 21, 2006.*

Extricity.com Web Pages Extricity Software, Mar. 2000, Retrieved from Archive.org Mar. 21, 2006.*

BEA WebLogic Collaborate Enabler for RosettaNet—User Guide BEA WebLogic, Feb. 2001.* van der Aalst, W.M.P. et al., The P2P Approach to Interorganizational Workflows 13th Conference on Advanced Information Systems, CAISE 2001.*

Jennings, N.R. et al., Implementing a Business Process Management System using ADEPT Applied Artificial Intelligence, 2000, vol. 14, pp. 421-463.*

Woo, Thomas et al., Authorization in Distributed Systems: A Formal Approach IEEE Sympoium on Security and Privacy, 1992.*

Alturi V. et al., An Authorization Model for Workflows Fifth European Symposium on Research in Computer Security, Sep. 1996.*

Chen et al., Dynamic Agents International Journal on Cooperative Systems, 1999.*

Griss, Martin, My Agent Will Call Your Agent . . . But Will it Respond? Hewlett-Packard, HPL-1999-159, Dec. 1999.*

Dayal, U. et al., Business Process Coordination: State of the Art, Trends and Open Issues Proceedings of the 27th VLDB Conference, 2001.*

Ott, Marcus, Conceptual Design and Implementation of a Graphical Workflow Modeling Editor in the Context of Distributed Groupware-Databases, University of Paderborn, Master Thesis, 1994.*

ActionWorkflow Enterprise Series 3.0 Process Builders User's Guide Action Technologies, Inc., 1996.*
Using the WFT Development Environment Template Software, 1998.*
Zeng et al., On Demand Business-to-Business Integration 9th International Conference on Cooperative Information SYstems, Lecture Notes in Computer Science, vol. 2172, 2001.*
Graupner, Sven et al., E-Speak—An Enabling Infrastructure for Web-based E-Services International Conference on Advances in Infrastructure, Jul./Aug. 2000.*
HP Process Manager—Product Overview Hewlett-Packard, Nov. 2000.*
Hung Chak Kuen Patrick, Secure Workflow Model The Hong Kong University of Science and Technology, Doctoral Thesis, Apr. 2001.*
Sandhu, Ravi S. et al., Role-Based Access Control Models IEEE, 1996, pp. 38-47.*

* cited by examiner

DEFINE PROCESS

| | |
|---|---|
| ROLES | BUYER, SELLER |
| TASKROLE | T1/BUYER, T2/SELLER |
| PROC_INSTANT ROLE | |
| PLYERS | |
| KEY | |
| PROC DATA PACKET | |

FIG. 3A

CREATE PROCESS INSTANCE

| | |
|---|---|
| ROLES | BUYER, SELLER |
| TASKROLE | T1/BUYER, T2/SELLER |
| PROC_INSTANT ROLE | SELLER |
| PLYERS | SELLER\|D1/A, BUYER\|D2/B |
| KEY | |
| PROC DATA PACKET | DATA INSTANCES |

FIG. 3B

INSTANTIATE PEER PROCESS INSTANCES

| | |
|---|---|
| ROLES | BUYER, SELLER |
| TASKROLE | T1/BUYER, T2/SELLER |
| PROC_INSTANT ROLE | SELLER |
| PLYERS | SELLER\|D1/A, BUYER\|D2/B |
| KEY | D1/A-100001 |
| PROC DATA PACKET | DATA INSTANCES |

FIG. 3C

PEER-TO-PEER INTER-ENTERPRISE COLLABORATIVE PROCESS MANAGEMENT METHOD AND SYSTEM

FIELD OF THE INVENTION

The present invention relates generally to inter-enterprise electronic commerce applications, and more particularly, to a peer-to-peer collaborative process management method and system for supporting collaborative business processes between players in different enterprises.

BACKGROUND OF THE INVENTION

Electronic commerce ("E-Commerce") is a distributed computing environment with dynamic relationships among a large number of autonomous service requesters, brokers and providers. In recent years, there has been much interest in the use of software agent technology to support the automation of E-Commerce. A world is envisioned where tasks that are normally performed by individuals are handled automatically by software agents. Examples of such tasks found in a company may include finding a suitable product for purchase, generating requests of quotes, negotiating price of the product, generating purchase orders, responding to requests for quotes, processing payment information, and shipping the product.

Most electronic commerce (E-Commerce) applications are based on business partnerships between different enterprises. Consequently, one important and necessary component to enable the automation of electronic commerce is a mechanism for supporting and facilitating the cooperation and collaboration between different parties (e.g., partners) in different enterprises.

There are several different prior art approaches for supporting a business process between two parties in different enterprises. A first prior art approach employs a central coordinator model. In this model, the execution of a business process has only one process instance that is handled by a central server (e.g., a central workflow engine). In other words, this coordination model employs a centralized coordinator or server to manage the interaction between agents. A business process typically has a plurality of tasks. Although tasks can be distributed among different agents, a central server manages the entire process.

Unfortunately, the central coordinator model is not suited for business processes that involve parties in different enterprises (i.e., inter-enterprise business collaboration). One reason that the central coordinator model is not suited for interaction across enterprises is that the central coordinator model has been designed and tailored for facilitating cooperation between agents that are in the same enterprise (i.e., intra-enterprise cooperation). Consequently, issues particular to cooperation between two different enterprises are not addressed by this approach.

As noted previously, most E-Commerce applications are based on inter-enterprise business partnerships, where parties across enterprise boundaries are unlikely to be organized into the same group or under a centralized coordinator. To summarize, this first prior art approach does not provide a mechanism for effectively managing a collaborative business process between different enterprises.

In a second prior art approach, electronic commerce (E-Commerce) applications or agents cooperate through message exchanges or conversations. An example of such an approach is described by the Foundation for Intelligent Physical Agents (FIPA) in a publication entitled, "FIPA97 Agent Specification," (see http://www.fipa.org/). Unfortunately, the second prior art approach has difficulties in modeling inter-enterprise business collaborative business processes.

One difficulty is that businesses typically collaborate by following certain rules or protocols, such as "if you send me a price request then I will send you a quote", and "if the quote I sent you is acceptable, then you will send me an order". Furthermore, these rules or protocols typically include sequences of steps, where some of those steps are nested. Consequently, these rules are difficult to manage with simple messages or conversations utilized by this prior art approach. Moreover, many real applications include complex business processes that have a number of concurrent, long-duration, nested tasks, which are difficult if not impossible to manage and trace through flat conversations.

Other approaches provide interfaces that may be utilized by parties, who wish to interact. An example of this approach is defined by the RosettaNet Consortium that was founded in 1998. The consortium defines standard interfaces between partners for business process integration. More specifically, the consortium is developing Partner Interface Processes (PIPs) that define the processes and data elements necessary for a broad set of supply chain scenarios. Unfortunately, these approaches do not provide an infrastructure for implementing the business process, nor do these approaches provide an execution model or strategy. For example, these approaches do not specify how partner process instances are synchronized or made to be aware of the progress of other processes.

Workflow Management

Workflow management is a rapidly evolving technology that many businesses in a variety of industries utilize to handle business processes. A business process, as defined by the Workflow standard—Terminology & glossary, Technical Report WFMC-TC-1011, Workflow Management Coalition, June 1996. Versions 2.0, is simply a set of one or more linked activities that collectively realize a business objective or a policy goal, typically within the context of an organizational structure defining functional roles and relationships. A workflow is defined as the automation of a business process, in whole or in part, during which documents, information, or activities are passed from one participant to another, according to a set of predefined rules. A workflow management system (WfMS) defines, creates, and manages the execution of workflows.

Conventional workflow systems are primarily designed for intra-enterprise process management. The general function of a workflow engine is to support the modeling and execution of business processes. Conventional workflow systems use a single server to schedule the tasks of the business process. Although the tasks that contribute to a process can be distributed, all tasks are centrally scheduled at the process level.

Such centralized process control may be appropriate for a single enterprise. However, centralized process control is not appropriate for business processes between partners in different enterpirses since intra-enterprise process management and inter-enterprise process management are significantly different.

When multiple parties, belonging to different enterprises, are involved in a business process, these parties are unlikely to use a centralized process management because they are often separated by firewalls, have self-interests, or do not wish to share all the process data. For example, it is unrealistic to have a buyer and a seller coordinated by a single workflow engine. Moreover, it is unreasonable for the buyer and seller to place their private data (e.g. negotiation threshold) into the common process data packet for flow control.

However, these parties need support for peer-to-peer interactions. The lack of such support is a major impediment for using conventional centralized workflow systems for inter-enterprise E-Commerce automation.

Based on the foregoing, there remains a need for a method and system for a mechanism to support collaborative business processes that involve players in different enterprises and that overcomes the disadvantages set forth previously.

SUMMARY OF THE INVENTION

According to one embodiment of the present invention, a collaborative business process management method and system for supporting interaction between players in different enterprises are described.

One aspect of the present invention is the provision of a de-centralized process management architecture for supporting inter-enterprise electronic commerce (e.g., business-to-business (B2B) electronic commerce).

Another aspect of the present invention is the provision of a cooperative process definition and a logical execution instance of the cooperative process definition, where the logical execution instance has a set of peer process instances that are executed by different servers in different enterprises (i.e., distributed control).

Another aspect of the present invention is the provision of an infrastructure for implementing a collaborative business process and an execution model that specifies how partner process instances are synchronized or made to be aware of the progress of other peer process instances.

Another aspect of the present invention is the provision of a collaborative process definition language (CPDL) for specifying collaborative business processes between different players. A collaborative business process includes a plurality of tasks that are each assigned to a specific player.

Another aspect of the present invention is the provision of a collaborative process manager (CPM) for each player in different enterprises to support peer-to-peer (P2P) process management at the business process level rather than at the conversation level.

According to one embodiment, an inter-enterprise collaborative process management method and system are provided. A collaborative business process for modeling inter-enterprise collaboration (e.g., peer-to-peer (P2P) or business-to-business (B2B) interaction) is defined. The collaborative business process involves at least two players from different enterprises. The collaborative business process has a plurality of work nodes or tasks. Each work node has a task-role identifier for identifying a particular player that is responsible for executing each work node. A first collaborative process manager (FCPM) associated with the first player is provided to execute a first peer instance of the collaborative business process. A second collaborative process manager (SCPM) associated with the second player is provided to execute a second peer instance of the collaborative business process. Messages are employed for synchronization of the first and second peer process instances and for the exchange of data therebetween.

Other features and advantages of the present invention will be apparent from the detailed description that follows.

BRIEF DESCRIPTION OF THE DRAWINGS

The present invention is illustrated by way of example, and not by way of limitation, in the figures of the accompanying drawings and in which like reference numerals refer to similar elements.

FIG. 3A illustrates an exemplary collaborative process at process definition. FIG. 3B illustrates an exemplary collaborative process at process instance creation. FIG. 3C illustrates an exemplary collaborative process at process instance instantiation.

DETAILED DESCRIPTION OF THE PREFERRED EMBODIMENT

A method and system for collaborative business process management for players in different enterprises are described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Peer-to-Peer Collaborative Process Management Infrastructure 10

Figure 1:
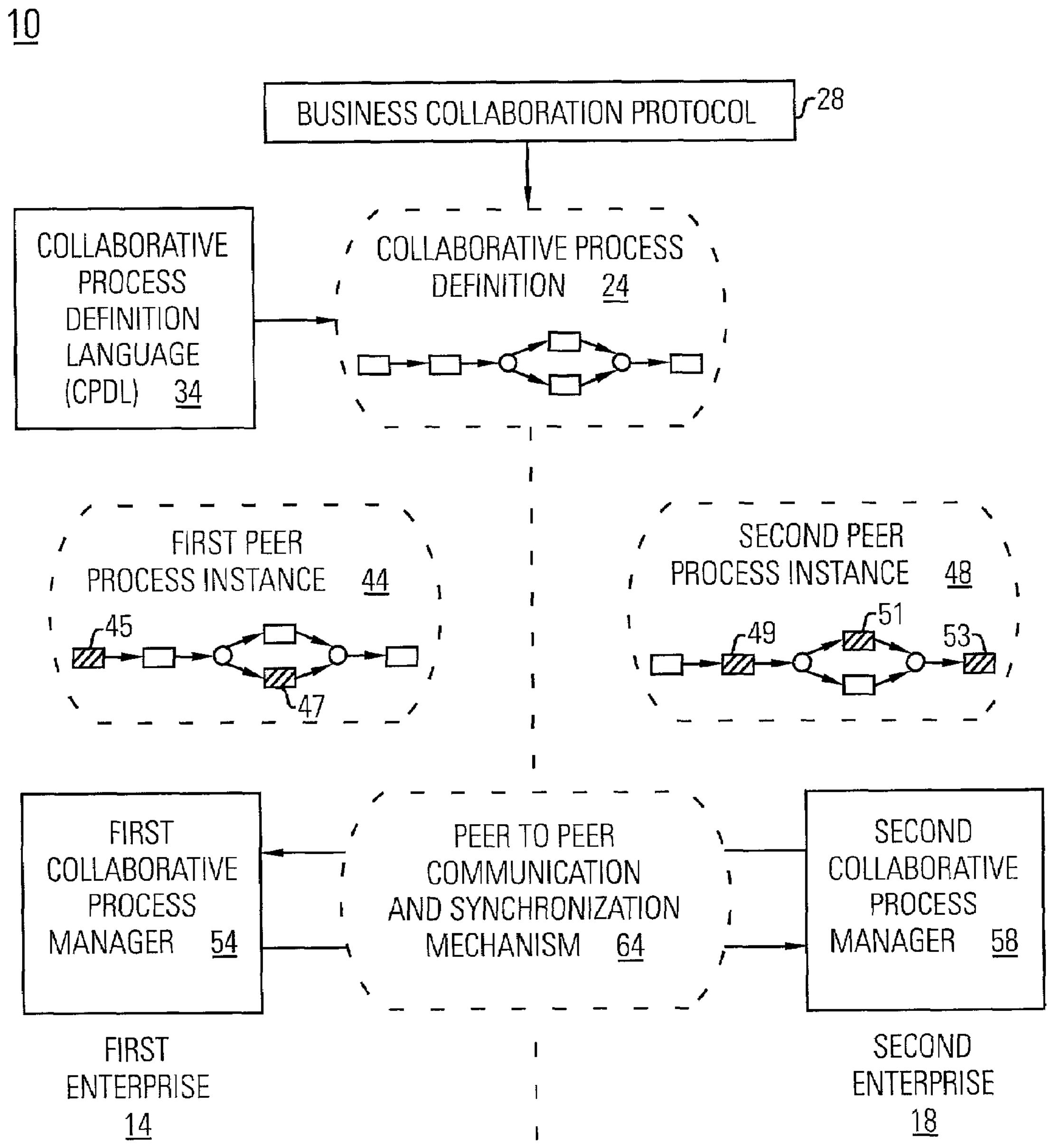
FIG. 1 illustrates a de-centralized peer-to-peer collaborative process management infrastructure according to one embodiment of the present invention.

FIG. 1 illustrates a de-centralized peer-to-peer collaborative process management infrastructure 10 according to one embodiment of the present invention. The peer-to-peer collaborative process management infrastructure 10 includes a first enterprise 14 and a second enterprise 18. For example, the first enterprise 14 can be a first company, and the second enterprise 18 can be a second company.

A collaborative business process definition 24 that involves a first player in the first enterprise 14 and a second player the second enterprise 18 is generated. The collaborative business process definition 24 includes a plurality of work nodes (also referred to herein as tasks). Some of the work nodes are the responsibility of the first player, and other work nodes are the responsibility of the second player.

The collaborative process definition 24 can be based on a business collaboration protocol 28 and specified by a collaborative process definition language (CPDL) 34 provided by the present invention. The collaborative process definition language (CPDL) 34 is described in greater detail hereinafter. An example of a collaborative business process definition 24 is a purchase and sale process involving a buyer and seller of a product. The business collaboration protocol 28 can be, for example, a Partner Interface Process (PIP) defined by the RosettaNet Consortium that was founded in 1998. A Partner Interface Process (PIP) defines the process and data elements required for a specific supply chain scenario.

Other protocols or standard interfaces that are defined between partners for business process integration may also be employed to generate the collaborative business process definition.

The collaborative process management infrastructure 10 also includes a first collaborative process manager (FCPM) 54 and a second collaborative process manager (SCPM) 58. The FCPM 54 executes a first peer process instance 44 of the CPD 24, and the SCPM 58 executes a second peer process instance 48 of the CPD 24. The execution of the first peer process instance 44 and the execution of the second peer process instance 48 form the execution of the collaborative business process or logical process instance.

Each CPM schedules, dispatches and controls the tasks of the process for which the player is responsible. For example, the FCPM 54 is responsible for processing shaded tasks 45 and 47 in the first peer process instance 44. Similarly, SCPM 58 is responsible for processing shaded tasks 49, 51 and 53 in the second peer process instance 48.

The collaborative process management infrastructure 10 also includes a peer to peer (P2P) communication and synchronization mechanism 64 for enabling data exchange and synchronization between the first CPM 54 and second CPM 58.

It is to be appreciated that the teachings of the present invention are not limited to two players, two CPMs, or two enterprises. For example, a collaborative business process can involve multiple players disposed across many enterprises, where each player has its own CPM.

Collaborative Process Management

As described previously, the collaborative process management mechanism of the present invention involves a collaborative business process. A collaborative business process involves multiple parties (also referred to herein as players or partners). The collaborative business process definition is based on a commonly agreed operational protocol, such as the protocol for on-line purchase or the protocol for an auction. In contrast to prior art approaches, the collaborative business process is not executed by a centralized workflow engine, but the present invention employs multiple engines (e.g., FCPM 54 and SCPM 58) to collaboratively execute the collaborative business process.

Specifically, each execution of a collaborative business process or a logical process instance includes at least two peer process instances that are executed by a Collaborative Process Manager (CPM) of the participating parties. These peer instances share the same collaborative business process definition, but may have private process data and sub-processes as described in greater detail hereinafter.

The CPMs execute these peer instances independently and collaboratively. The CPM of each party is used to schedule, dispatch and control the tasks for which the party is responsible. Moreover, the CPMs communicate through an inter-CPM messaging protocol that can be used to synchronize process execution. For example, the present invention provides an XML-based Collaborative Process Definition Language (CPDL) for specifying collaborative business processes.

For example, when a first player (e.g., a buyer) wants to buy something from a second player (e.g., a seller), the buyer-side CPM engine, A, creates a logical instance of the purchasing process, and initiates a "buyer-side" peer instance. Then, A notifies the seller-side CPM, B, to instantiate a "seller-side" peer instance of the purchase process. The peer process instances at both sides can be considered as autonomous, but both the buyer and the seller are complying with a predetermined purchase protocol.

When A finishes a task, A informs B of the task status so that B can proceed. Similarly, when B finishes a task, B informs A of the task status so that A can proceed. It is noted that the entire purchase process is not handled by a centralized server, but by the peer-to-peer cooperation of multiple servers in accordance with the CPM mechanism of the present invention.

Peer-to-Peer Collaborative Processes

However, the collaborative business process is executed by multiple distributed CPMs of the participating parties or players. An inter-enterprise collaborative process is defined based on the corresponding business protocols. The collaborative business process definition then becomes the common template for all the participating parties or players to share.

However, an execution of a collaborative process, which can be viewed as a logical instance of the process, actually includes multiple peer instances that are not executed by a centralized workflow engine, but by multiple CPMs that are synchronized through peer-to-peer communication. The CPM at each side recognizes tasks for which that CPM is responsible based on role-matching, which is described in greater detail hereinafter.

For example, an on-line trading process P is executed collaboratively by a seller and a buyer in such a way that each peer CPM executes an individual process instance of P. The CPM at buyer side is only responsible for scheduling and dispatching the tasks to be executed by the buyer. These tasks can include preparing a purchase order and making a payment.

Similarly the CPM at seller side is only responsible for the tasks that belong to the seller. The CPMs exchange task execution status messages, which are described in greater detail hereinafter, for synchronization.

Compared with the conventional workflow and sub-process handling techniques, the CPM approach of the present invention differs in that the present invention employs a decentralized and collaborative process management. It is noted that the present invention introduces decentralization to the process management level rather than at the task execution level.

The CPM approach of the present invention is different from the prior art RosettaNet PIP approach in at least the following aspects. First, the collaborative process management of the present invention is based on process-level business protocols. Given a collaborative business process (P), although each party may only be responsible for a few steps of P, the party has a global view to the whole business process from the shared process definition. In sharp contrast, the PIP approach is interface based, thereby exposing only individual "hand-shake" or conversation points of partner processes. In this regard, the PIP approach does not provide each partner with a global level view of the business process.

Second, a peer-to-peer execution mechanism for collaborative processes is provided by the present invention. As mentioned above, each execution of a collaborative process includes logically related process instances, for which the CPM infrastructure provides an execution model. In contrast the prior art PIP approach does not have a corresponding execution model. Also, the execution of partner processes by the PIP approach are not related and synchronized at process-level.

Collaborative Process Manager (CPM) 200

Figure 2:
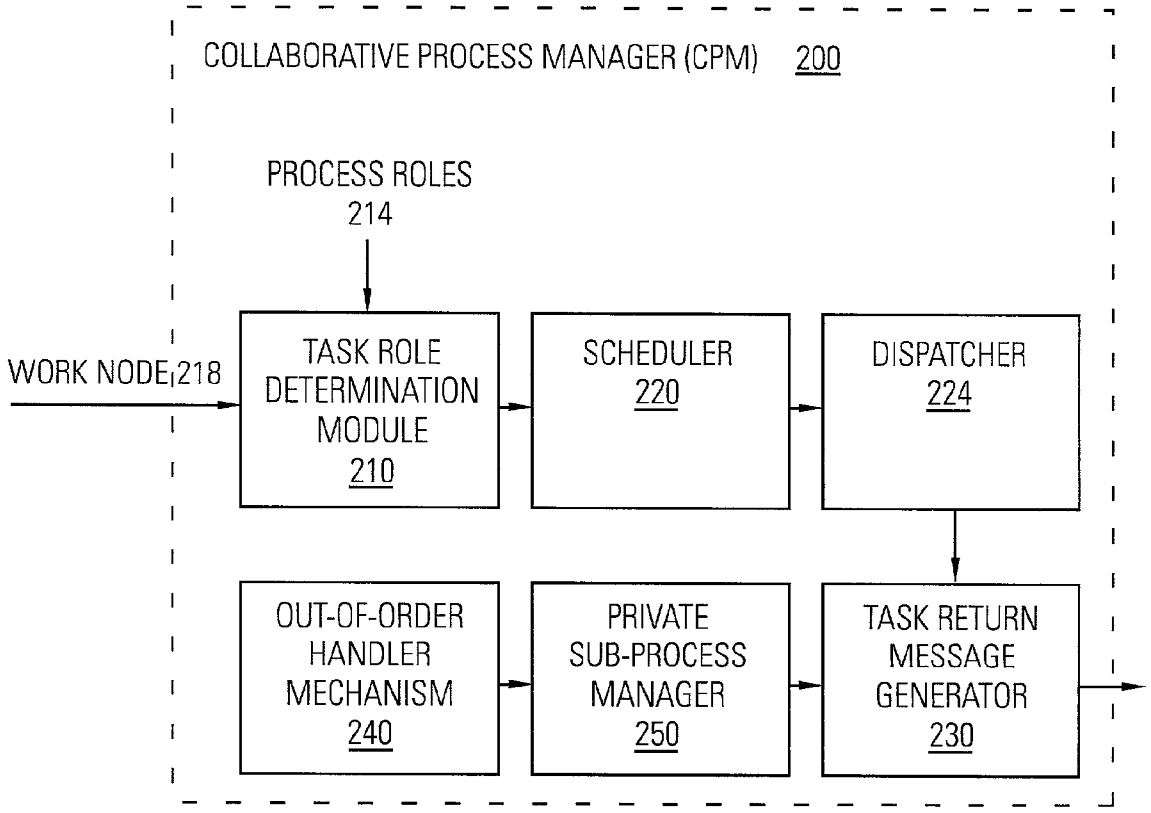
FIG. 2 is block diagram illustrating in greater detail the collaborative process manager in accordance with one embodiment of the present invention.

FIG. 2 is block diagram illustrating in greater detail a collaborative process manager 200 in accordance with one embodiment of the present invention. The collaborative process manager 200 can, for example, be CPM 54 or CPM 58 of FIG. 1. The collaborative process manager 200 includes a task role determination module 210 that receives a current work node 218 (also referred to herein as a task) and process roles 214, and based thereon determines whether the current task is the responsibility of the CPM 200. Each task or work node 218 has assigned thereto a role (e.g., buyer). Each peer process is also assigned a role (e.g., buyer). The task role and process role are described in greater detail with reference to FIGS. 3A-3C. The task role determination module 210 compares the role of the current task with the role of the peer process to determine if the is responsible for processing the current task.

When it is determined that the current task is the responsibility of the CPM 200, then the CPM 200 employs a scheduler 220 to schedule the task 218 and a dispatcher 224 to dispatch the task 218 for execution. After execution is complete, the CPM 200 employs a task return message generator 230 to generate and send (e.g., broadcast) the task return message to other CPMs of players involved in the collaborative business process.

When it is determined that the current task is not the responsibility of the CPM 200, then the CPM 200 does not execute the task 218 and instead waits for another CPM to execute the task and to send a corresponding task return message.

The collaborative process manager 200 also includes an out-of-order handler mechanism 240 for handling situations where task return messages, for example, are received in an order that is different from an intended order. The out-of-order handler mechanism 240 is described in greater detail hereinafter with reference to FIG. 7.

The collaborative process manager 200 also includes a private sub-process manager 250 for allowing each player to keep certain data private. The mechanism employed to keep process data objects private is described in greater detail hereinafter with reference to FIG. 8.

Collaborative Process Management Processing

Figure 4:
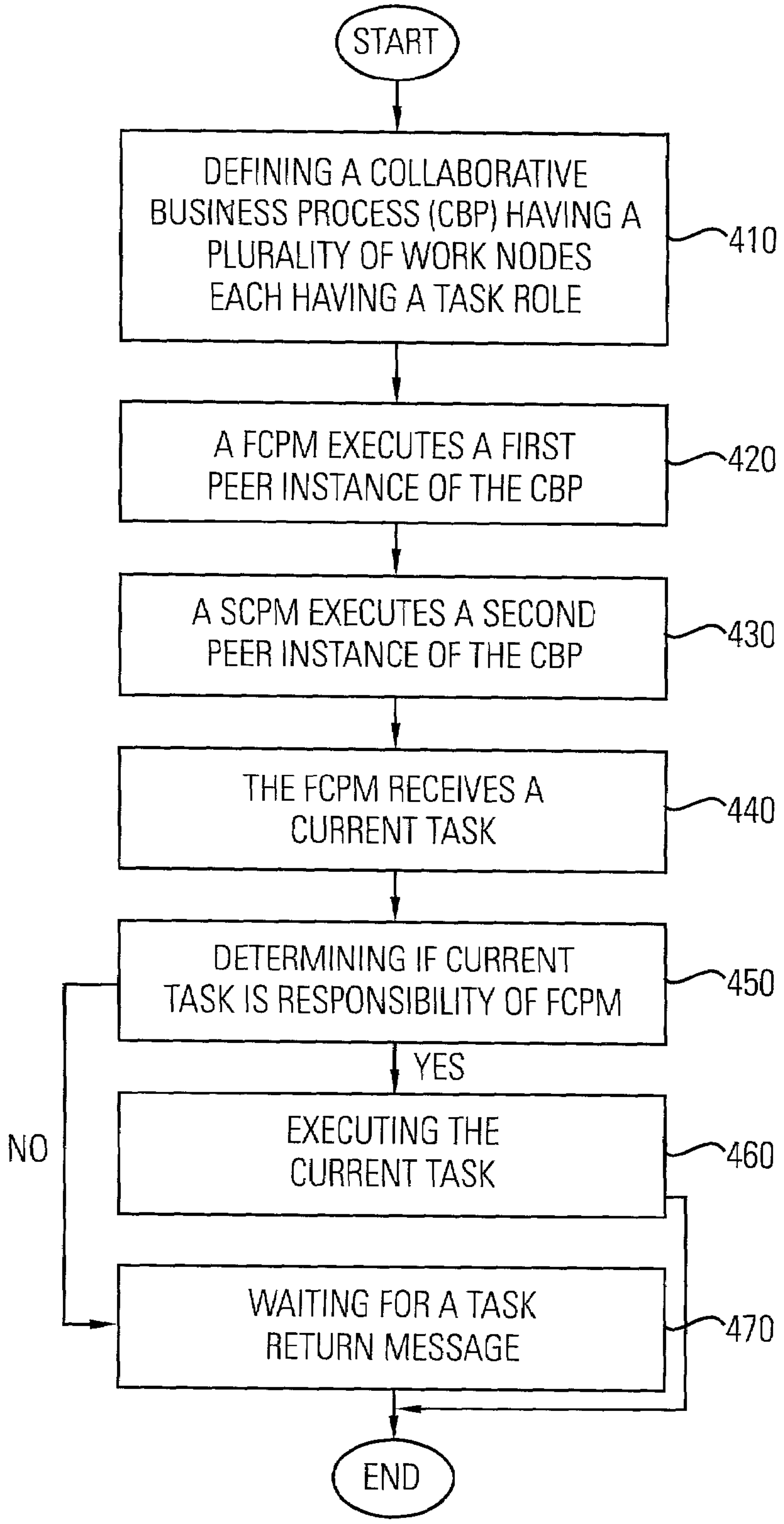
FIG. 4 is a flow chart illustrating the processing steps of the collaborative process management method in accordance with one embodiment of the present invention.

FIG. 4 is a flow chart illustrating the processing steps of the collaborative process management method in accordance with one embodiment of the present invention. In step 410, an inter-enterprise collaborative business process (CBP) having a plurality of work nodes is defined. Each work node has a task role for indicating a role that is responsible for executing the work node. The collaborative business process involves a first player in a first enterprise and a second player in a second enterprise. The first player has a first collaborative process manager (FCPM), and the second player has a second collaborative process manager (SCPM).

Each work node has a task role identifier for specifying a role that is responsible for the execution of the work node or task. In step 420, the first collaborative process manager executes a first peer instance of the collaborative business process. In step 430, the second collaborative process manager executes a second peer instance of the collaborative business process. The first peer instance of the collaborative business process and the second peer instance of the collaborative business process form a logical execution instance. Each peer instance has a process role. When the task role of a work node matches the process role of the peer instance, the particular peer instance is responsible for executing the work node.

Also, the first peer instance of the collaborative business process and the second peer instance of the collaborative business process communicate through messages for information exchange and synchronization.

In step 440, the first collaborative process manager receives a current task. In step 450, the first collaborative process manager determines if the current task is the responsibility of the first collaborative process manager by comparing the task role of the current task with the role of the first peer instance.

In step 460, when the current task is the responsibility of the first collaborative process manager, the current task is executed by the first CPM. Step 460 can have the following sub-steps. First, the current task is scheduled and dispatched for execution. Second, when the execution is complete, a task return message is generated and provided to other process instances (e.g., the second process instance executing on the second collaborative process manager).

In step 470, when the current task is not the responsibility of the first collaborative process manager, the first CPM does not execute the current task. Step 470 can includes the following sub-steps. The first CPM waits for a task return message from the second collaborative process manager. Once the task return message has been received from the second collaborative process manager, the first CPM evaluates whether an out-of-order condition has occurred (i.e., whether the current task return message has been received in an out-of-order fashion). When an out-of-order condition has occurred, the task return message is queued for later processing. Otherwise, when an out-of-order condition has not occurred, the next task is processed by employing the task return message.

Collaborative Process Definition

The collaborative process management approach of the present invention extends the current workflow technology. The following definitions related to business process modeling are provided. A process is modeled as a directed acyclic graph (DAG) with nodes representing the steps, or tasks, and arcs representing the links of those steps. A work-node represents a step (task) and is associated with an activity (i.e., a piece of work that contributes to the accomplishment of the process that may be executed either by a program (e.g. a software agent) or by a human worker).

A process is associated with a packet of process data. When an activity is launched, a subset of the process data, sub-packet, is passed to it; when it is completed, together with task status information, the sub-packet, possibly updated during the task execution, is sent back for reconciliation with the process data packet. A route-node specifies the rules and conditions for flow control, process data update, etc. Conventionally, a process execution creates a single process instance. However, for a collaborative process, the logical instance of each execution includes at least two peer process instances that form a single logical execution instance. Further, a collaborative process may have multiple concurrent executions.

To support collaborative processes, the CPDL of the present invention provides the following extensions to process definition. A collaborative process has a list of process-roles that indicates the logical participants of the collaborative processes. For example, if a simple purchase process has two roles (a buyer role and a seller role), then there are two peer instances involved in the execution of the purchase process. One peer instance is executed by a first CPM for the buyer. Another peer instance is executed by a second CPM for the seller. These two peer instances are assigned a buyer role and a seller role, respectively.

Each work-node has a task-role that matches one of the process-roles. In the above example, work nodes can have a task role of a “buyer” or a “seller”. If the task role of a work node is “buyer”, the work node is only executed in the peer process instance with a process-role of “buyer”.

It is noted that a work node may also have an activity-role (e.g., such as an “invoice-generator” role), that specifies that the work node is to be executed by (or dispatched to) an agent playing the “invoice-generator” role in this process.

In an inter-enterprise collaborative process execution, each party may want to keep some of the process data private. For example, the buyer in one enterprise and the seller in another enterprise do not want to expose their thresholds during price negotiation. In the process definition, templates for holding the definitions and initial values of process data objects can be specified. Furthermore, the sharing scope of the data objects is specified. A template may be public (i.e., sharable by all process-roles and thus, all peer process instances) or process-role specific (i.e., sharable only by peer process instance(s) having the specified process-role(s)).

In other words, a role-specific template may be accessed only by the peer process instances of the specified roles. It is noted that the templates can be made different for different process-roles. Consider a collaborative process with roles “buyer”, “seller” and “bank”. Some data are private to “buyer”. Some are sharable by “buyer” and “seller”. Some data are public to all three roles. The initial data packet of a peer process instance includes appropriate templates, where the sharing scope of each data object is specified. This data packet can be updated or expanded at run time.

An exemplary collaborative process for on-line purchase that is based on the OBI (Open Buying on Internet) protocol is now described. The protocol, obi_process, has process-roles “buyer” and “seller”. Each logical instance of obi_process has two peer-instances executing at two peer CPMs, A and B, respectively, one at the buyer side and one at the seller side. It has several tasks (steps) including $T_1$ (make purchase order), $T_2$ (process purchase order), etc. $T_1$ is a step that the buyer is responsible for, so its role is “buyer”, while the role of $T_2$ is “seller”. CPM A, executing the peer instance with role “buyer”, is responsible for executing $T_1$, and CPM B, executing the peer instance with the role “seller”, is responsible for executing $T_2$.

The initial data packet for process-role “buyer” includes templates obi_tpl and obi_buyer_tpl, while the initial data packet for process-role “seller” includes template obi_tpl and obi_seller_tpl. The activity “Action2 has an activity role “order examiner”, and thus, it is dispatched to an agent with activity-role “order examiner” for execution.

The specification of this process is described herein below. The specification is Workflow Coalition (WFC) standard compliant, but is in a XML format. When compiled, the specification is first translated into a Document Object Model (DOM) tree of Java objects, and then into a Java class for cooperative process definition.

```
<PROCESS name=“OBI__PROCESS” ..>
    <ROLES> Seller, Buyer </ROLES>
    ..
    <WORK__NODE name=“T1”>
        <ROLE> Buyer </ROLE>
        <DESC> Make PurchaseOrder </DESC>
        <ACTIVITY> Action1 </ACTIVITY>
    </WORK__NODE>
    <WORK__NODE name=“T2”>
        <ROLE> Seller </ROLE>
        <DESC> Process PurchaseOrder </DESC>
        <ACTIVITY> Action2 </ACTIVITY>
    </WORK__NODE>
    ..
    <ARC name=“Arc0” type=“START”> <FROM></FROM> <TO>WorkNode1</TO> </ARC>
    <ARC name=“Arc1” type=“FORWARD”> <FROM>WorkNodel</FROM> <TO>WorkNode2 </TO> </ARC>
    ...
    <PROCESS__DATA>
        <TEMPLATE> obi__tpl</TEMPLATE>
    </PROCESS__DATA>
    <PROCESS__DATA>
        <ROLE> Seller </ROLE>
        <TEMPLATE> obi__seller__tpl</TEMPLATE>
    </PROCESS__DATA>
    <PROCESS__DATA>
        <ROLE> Buyer </ROLE>
        <TEMPLATE> obi__buyer__tpl</TEMPLATE>
    </PROCESS__DATA>
</PROCESS>
<TEMPLATE name=“obi__seller__tpl”> .. </TEMPLATE>
<TEMPLATE name=“obi__buyer__tpl”>    </TEMPLATE>
.
<ACTIVITY name=“Action2” type=“PROCESS” imp=“AGENT”>
    <DESC> Process purchase order </DESC>
    <ROLE> order examiner </ROLE>
    <CLASS> PurchaseOrderResult</CLASS>
    <URL> file·cba hp.com/ecarry/CBLclasses </URL>
    <ARGS> ... </ARGS>
</ACTIVITY>
```

Collaborative Process Execution

An execution of a collaborative process includes a set of peer process instances that is executed by the CPMs of the participating parties. These instances share the same process definition, but they have additional properties and may have private process data and sub-processes as described in greater detail hereinafter with reference to FIG. 8.

Each peer process instance has a role that matches one of the process-roles. When a peer process instance is launched by a CPM at the seller side, for example, the process-instance-role is "seller", and the CPM is only responsible for scheduling and dispatching the work nodes or tasks with task-role "seller".

When executing a collaborative business process, the player of each peer process instance must be specified and bound to the corresponding process instance role. In addition, a logical identifier for this execution must be obtained. These two pieces of information are captured as properties in every peer process instance.

The player identifier indicates the CPMs participating in the execution of a collaborative business process. A player is associated with four attributes: a role, a domain name, a local name, and inter-domain messaging service. Each of these attributes is now described.

The role attribute specifies the role (e.g., "buyer" or "seller") of the given process instance, executing at the CPM, that represents this player. It is noted that without binding to a peer process-instance, a CPM does not have a fixed role.

The domain name attribute specifies a domain. A domain is a group of communicating servers coordinated by a coordinator server of that domain. The name of the domain is the name that the coordinator uses to register with an inter-domain messaging service infrastructure, such as HP E-Speak service bus, which is described in greater detail at the following website: http://www.e-speak.net. The coordinator can be viewed as the gateway to the domain. An example of a domain name is "corp.hp.com".

The local name attribute specifies the local name of the CPM server within the domain to represent the player. Each server has a unique local name within a domain. While a domain may have multiple CPM servers, one or more CPMs are selected to represent the players in this process instance. For example, corp.hp.com/buying_agent may be a player playing the buyer role in a purchasing business process, whose peer CPM in this process may be us.oracle.com/sales_agent.

The inter-domain messaging service attribute specifies an inter-domain messaging service infrastructure, such as HP E-Speak, that provides messaging services for inter-domain CPM communication. The messaging service infrastructure is capable of delivering messages among multiple domains. When inter-domain CPMs rely on the E-Speak service bus to reach each other, the addressing structure is espeak: domain_name/local_name. An example is espeak:corp.hp-.com/buying_agent.

The CPM method and system of the present invention employs a cooperation key (coop-key) to identify a logical instance of a collaborative process and to correlate and synchronize the multiple peer instances of the execution of a single collaborative process. All the messages exchanged for that execution are marked by a unique coop-key. In one embodiment, each CPM can run multiple process instances concurrently, and each instance has a local identifier (ID). Each CPM engine maintains a mapping table between coop-keys and local process instance IDs. When a message relating to the execution of a collaborative process is received, the coop-key is used to identify the corresponding local process instance.

FIG. 3A illustrates an exemplary collaborative process at process definition. FIG. 3B illustrates an exemplary collaborative process at process instance creation. FIG. 3C illustrates an exemplary collaborative process at process instance instantiation. As shown in FIGS. 3A-3C, when a collaborative process is defined, it is specified with the process-roles and task-roles. When a logical process instance is created, the players and the roles they play are specified. The CPM at the creating party obtains a cooperation key (coop-key) for this logical process, creates a peer process instance for itself, and associates this key with its peer process instance. When the CPM at the creating party sends requests to other peer CPMs (i.e., the other players of the process) to instantiate the peer process instances, the coop-key is also specified. This coop-key is encapsulated in all the messages on the above logical process instance, and transferred to all peer sides to correlate peer instances of the collaborative process execution.

Using the above obi_process as an example, the execution of a collaborative process is carried out in the following way:

CPM A, representing the process-instance-role of "buyer", initiates a buyer-side process instance $P_b$ and through messaging, tells CPM B to create a seller-side peer process instance $P_s$.

A dispatches and executes $T_1$, and upon receipt of the task return message, $r_1$, forwards it to all other players of the process, in this case, simply B. Both A and B update their process state and schedule the possible next step of their own peer process instance based on that message.

When A proceeds to activity $T_2$, since the role represented by A does not match the role of $T_2$, A simply waits for the peer server, that is B in this example, to handle it at the peer site.

When B proceeds to activity $T_2$, since the role represented by B matches that of $T_2$, $T_2$ is handled by B.

The execution of peer process instances at both peers CPMs progresses in this manner towards their respective ends.

Synchronizing Process Data and Data in the Task Return Messages

The CPM system of the present invention synchronizes process data is the following manner. A CPM dispatches a work node or activity to a software agent or a human user to perform. Upon the termination of the work node or activity, a task return message is sent back and used to trigger the next step in process execution. The task return message preferably includes the following information:

coop-key of the logical process instance, handles (e.g., local identifiers) of the process instance, task, and activity, activity execution status, the sub-packet (i.e., the subset of process data passed to or generated by the activity).

When a task return message returns to the local CPM engine, the task return message includes all of the above information. Since the sub-packet of the process data passed to the activity may be updated during task execution, it is important for the sub-packet to be reconciled with the process data packet after returning. However, before such a message is forwarded to a peer player, only the updated data elements that are shared with the player are retained. As noted previously, the sharing scope of each data element is specified in the process definition.

It is noted that the CPM infrastructure of the present invention can be combined with a service bus, such as E-Carry, to allow the scaling of agent cooperation from a conversation level to business process level and from intra-enterprise cooperation to inter-enterprise collaboration.

Examples of Out-of-Order Message Delivery

Figure 5:
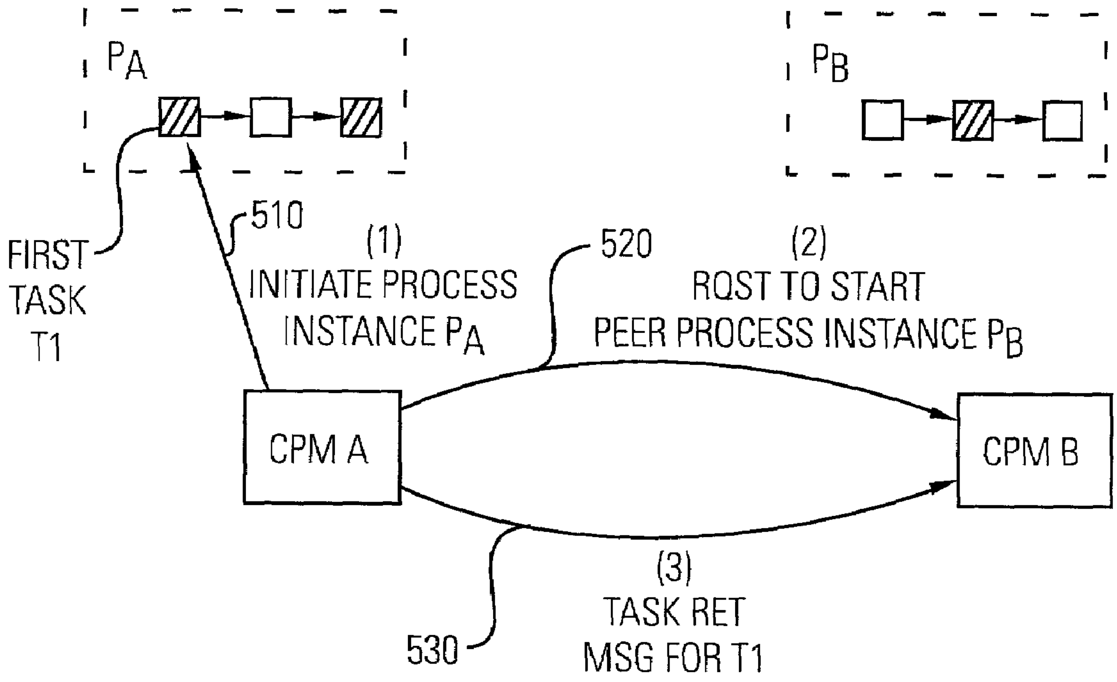
FIG. 5 illustrates a first example of an out-of-order message delivery.

For various reasons, messages may not be delivered to a receiving CPM in the original intended order. FIG. 5 illustrates a first example of a situation that may result in an out-of-order message delivery. In this example, a first CPM (e.g., CPM A) initiates a first process instance ($P_A$), and then starts to execute a first task (T1). Next, the first CPM (e.g., CPM A) informs a second CPM (e.g., CPM B) to create and execute a second peer process instance ($P_B$) shortly after initiating the first process instance ($P_A$). Upon completion of the first task (T1), the first CPM (CPM A) forwards a task return message associated with the first task (T1) to the second CPM (CPM B).

A possible consequence that is caused by the out-of-order message delivery is that when the task return message of the first task (T1) reaches the second CPM (CPM B), the second peer process instance ($P_B$) may not have yet been initiated or may have been initiated by not yet completed. Consequently, there is no support for processing the above message.

Figure 6:
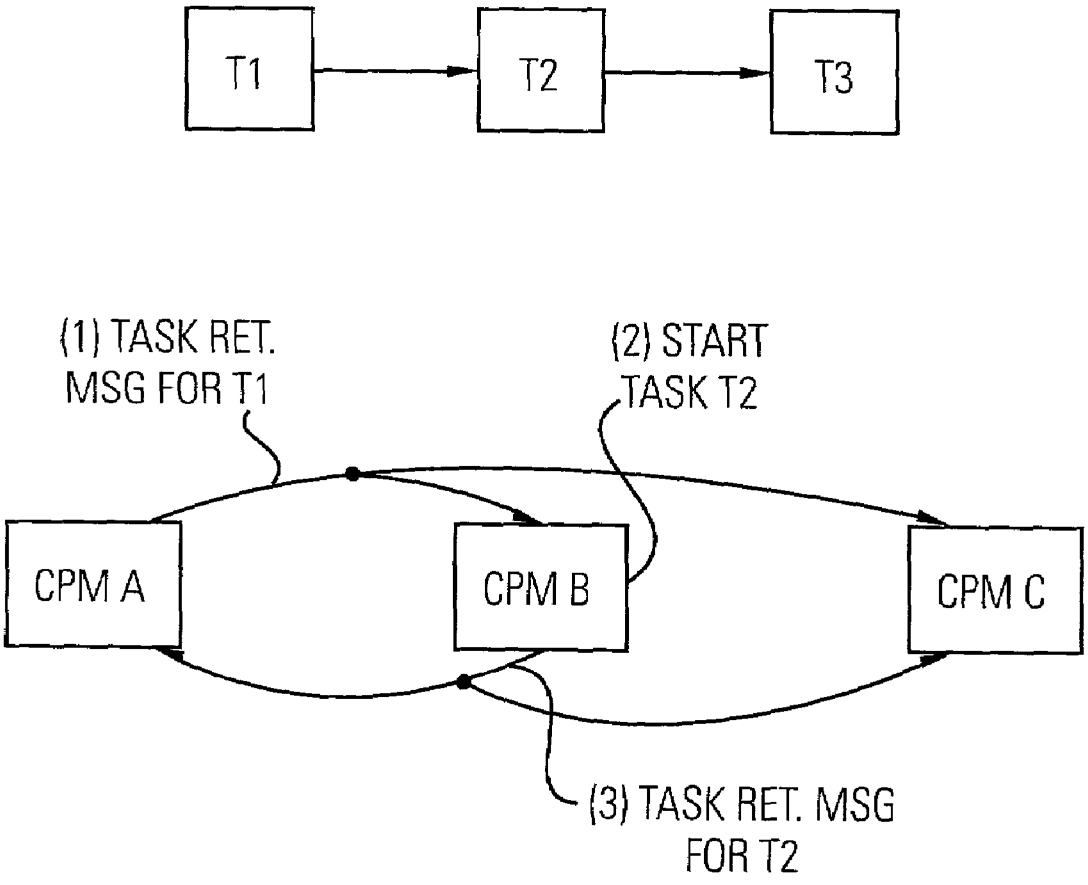
FIG. 6 illustrates a second example of an out-of-order message delivery.

FIG. 6 illustrates a second example of out-of-order message delivery. In this example, consider the execution of a collaborative business process that has three peer instances executing on a first CPM (CPM A), a second CPM (CPM B), and a third CPM (CPM C), respectively. The first CPM (CPM A), the second CPM (CPM B), and the third CPM (CPM C) are responsible for tasks $T_1$, $T_2$ and $T_3$, respectively. These tasks are to be executed in the following order: $T_1$, $T_2$, and $T_3$.

When the first task $T_1$ that is being executed by the first CPM (CPM A) is complete, CPM A forwards a task return message ($msg_1$) of the first task ($T_1$) to both CPM B and CPM C. Upon receipt of the task return message ($msg_1$), CPM B start to execute a second task ($T_2$). When the second task ($T_2$) is completed, CPM B forwards the task return message ($msg_2$) of the second task ($T_2$) to both CPM A and CPM C.

In this scenario, a possible consequence caused by out-of-order message delivery is that when the second task return message ($msg_2$) reaches CPM C, CPM C has not yet received the first task return message ($msg_1$). In this case, processing second task return message ($msg_2$) before processing the second task return message ($msg_1$) by CPM C can lead to an inconsistent or un-intended result.

Out-of-Order Message Handling Mechanism

Figure 7:
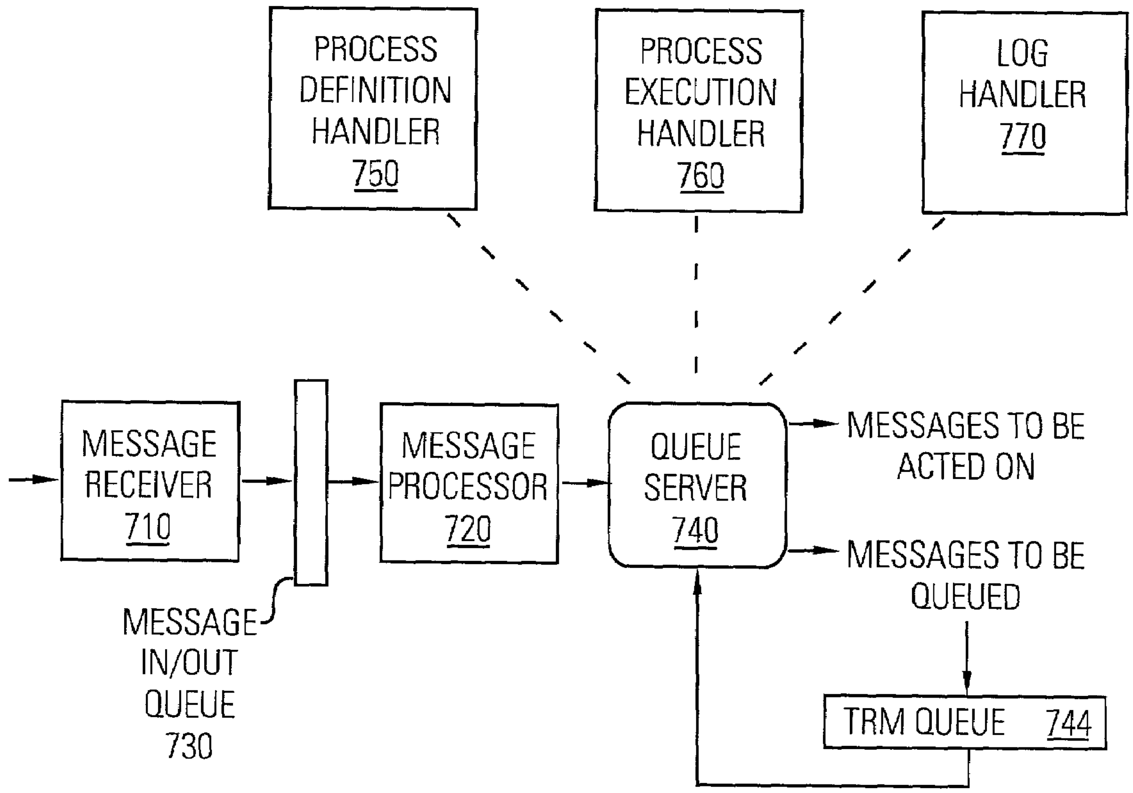
FIG. 7 is a block diagram illustrating in greater detail the out-of-order message handling mechanism of FIG. 1 in accordance with one embodiment of the present invention.

FIG. 7 is a block diagram illustrating in greater detail the out-of-order message handling mechanism 240 in accordance with one embodiment of the present invention. The out-of-order message handling mechanism 240 ensures the right order of message processing. Specifically, the out-of-order message handling mechanism 240 employs a queuing technique and the knowledge provided by the collaborative process definitions to resolve the out-of-order message delivery problems, such as the problems described above.

The out-of-order message handling mechanism 240 includes a message receiver 710 for receiving messages, a message processor 720 for processing the received messages, and a message in/out queue 730 for holding received messages until the message processor 720 is available for processing the next message.

In addition, the out-of-order message handling mechanism 240 includes a process definition handler 750 for providing process definition, a process execution handler 760 for providing execution information (e.g., CPM internal events and instance status changes), and a log handler 770 for providing an execution history. The out-of-order message handling mechanism 240 also includes a queuing server 740, in additional to the regular message handling mechanism (710, 720, and 730).

The queuing server 740 is workflow specific in that the queuing server 740 interfaces with the process definition handler 750, the process execution handler 760, and the log handler 770 and employs the definitions and execution histories to make operational decisions. The queuing server 740 also responds to CPM internal events such as process instance status changes.

The queuing server 740 employs a task return message (TRM) queue 744 for holding task return messages when an out-of-order condition has been detected. The general functions of the queuing server 740 are now described. When a message is received, the queuing server 740 checks to determine if the message is ready to be processed based on the process definition, execution history, and queued messages. When the message is not ready to be processed, the queuing server 740 queues the message in TRM queue 744. In the above example (FIG. 6), if the task return message ($msg_2$) for the second task $T_2$ cannot be executed at CMP C because CMP C has not yet received the task return message for the first task $T_1$, the queuing server 740 puts the task return message ($msg_2$) for the second task in the queue.

After a new message is processed, the queuing server 740 checks to determine if any queued message is ready to be processed as a result. When the queued message is ready to be processed, the queuing server 740 dispatches the message for processing. In the above example (FIG. 6), assume that CPM C queued $msg_2$ for task $T_2$ since CPM C did not yet receive the task return message, $msg_1$, for $T_1$. Subsequently, when $msg_1$ is eventually received, CPM C processes $msg_1$ for $T_1$ first and then processes $msg_2$ for task $T_2$.

When a CPM internal event about process instance status change (e.g. process instance started, process instance terminated, process instance suspended) is received, the queuing server 740 checks if the status change makes any queued message ready to be processed. In the example shown in FIG. 5, assume that the task return message for $T_1$ is queued as a result of the unavailability of $P_B$, upon receipt of the event on $P_B$'s availability, the queuing server 740 enables the processing of that message.

Private Sub-Processes

Figure 8:
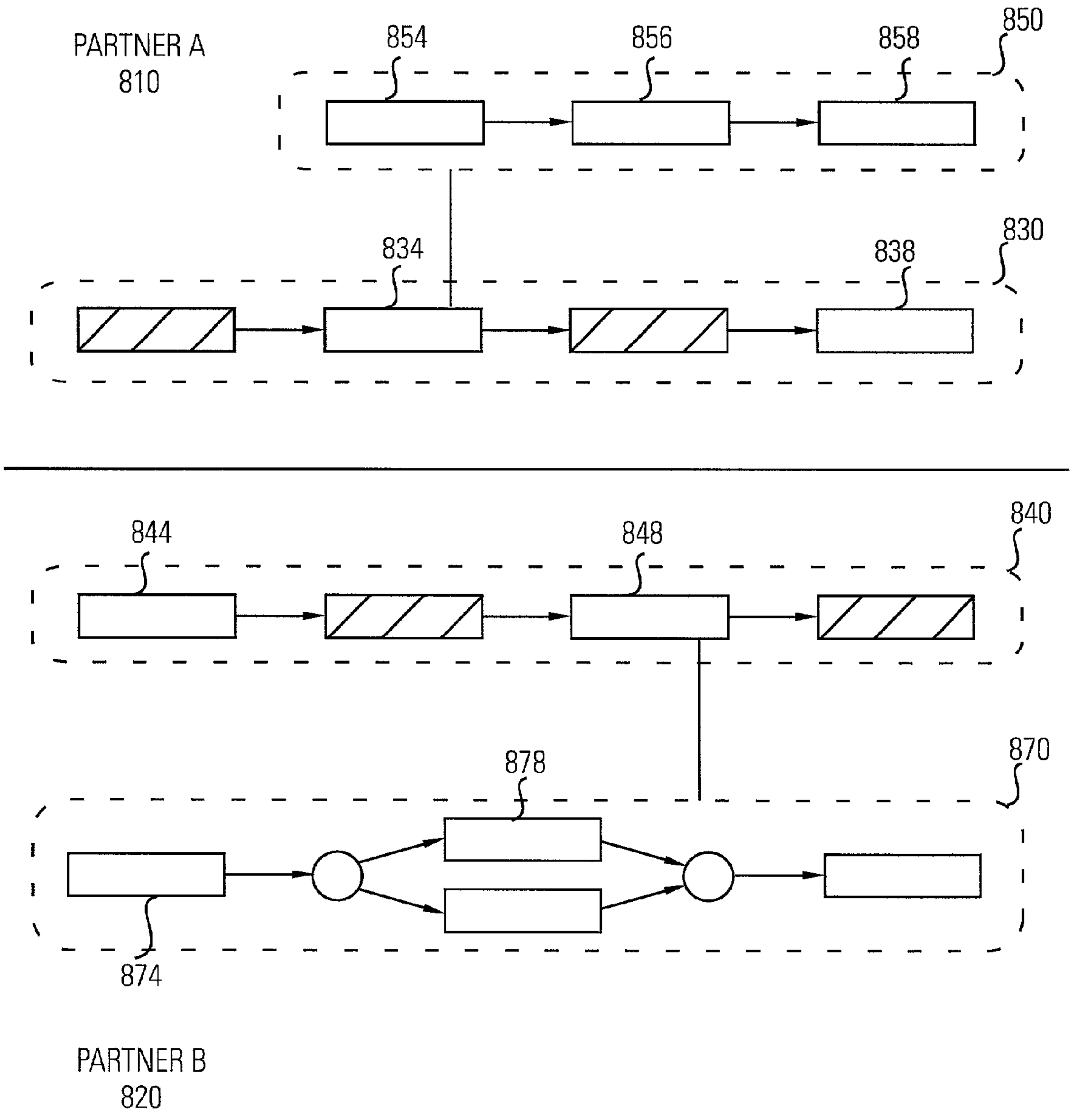
FIG. 8 illustrates how private sub-processes can be employed by the collaborative process manager to keep internal data private.

FIG. 8 illustrates how private sub-processes can be employed by the collaborative process manager to handle internal activities. A first partner 810 (e.g., partner A) and a second partner 820 (e.g., partner B) are involved in a collaborative business process. A CPM of the first partner 810 executes a first peer instance 830 of the collaborative business process, and a CPM of the second partner 820 executes a second peer instance 840 of the collaborative business process. The CPM of the first partner 810 is responsible for processing tasks 834 and 838, and the CPM of the second partner 820 is responsible for processing tasks 844 and 848.

It is noted that the first peer instance 830 can have a private sub-process 850 that has tasks 854, 856, and 858 that are not transparent to the second peer instance 840. Similarly, the second peer instance 840 can have a private sub-process 870 that has tasks (e.g., tasks 874 and 878) 854 that are not transparent to the first peer instance 830.

In this regard, a task may represent a private sub-process with a private data packet. The sub-process binding is dynamic (i.e., bound at run time). This allows a private sub-process to be designed separately from the host process. Furthermore, the process data of the internal sub-process is entirely private to the party executing the sub-process. An example is provided hereinbelow.

```
<ACTIVITY name="Action7" type="PROCESS" imp="SUBPROC">
    <DESC> Check credit </DESC>
    <SUBPROC> Check_credit_process </SUBPROC>
</ACTIVITY>
```

In the foregoing specification, the invention has been described with reference to specific embodiments thereof. It will, however, be evident that various modifications and changes may be made thereto without departing from the broader scope of the invention. The specification and drawings are, accordingly, to be regarded in an illustrative rather than a restrictive sense.

What is claimed is:

1. A method for managing peer-to-peer collaborative inter-enterprise business processes between two different enterprises having first and second collaborative process managers (CPM) comprising:

defining a collaborative business process (CBP) specified by a collaborative process definition (CPD) and based on a collaboration protocol, the CPD comprising:

(1) a list of participating process-roles for first and second peer process instances, (2) plural work nodes each having an activity to be completed and a task role that matches one of the defined process-roles and private sub-processes unavailable to other peer process instances, and (3) templates having definitions, initial values and sharing scope, being specified as public or private, of process data objects, the templates being either public and sharable by all process roles and peer process instances or private and sharable by only peer instances having a specified process-role;

performing the CBP by instantiating and executing first and second peer process instances of the CBP by the CPMs to form a single logical execution instance of the CBP identified by a unique cooperation key assigned to the peer process instances each having a role and being responsible only for the work nodes having a role matching the role of the peer process instance;

wherein the CPMs' schedule, dispatch and control work nodes and include a private sub-process manager and an out-of-order handler mechanism that halts execution when messages from other CPMs are received out-of-order;

launching activities of the work nodes by exchanging process data having the templates that specify sharing scopes of the exchanged data objects and updating the templates and sharing scope during process data exchange; and using the cooperation key to identify a logical instance of the CBP and to correlate and synchronize via peer-to-peer information exchange between the first and second CPMs.

2. The method of claim 1, wherein when message relating to execution of a collaborative process is received, the cooperation key is used to identify a correct local process instance.

3. The method of claim 1, wherein process data in a private template is not sharable by all peer process instances but private to one of the first and second peer process instances.

4. The method of claim 1 further comprising, specifying rules in the sharing scope for sharing both public and private data between the first and second peer process instances.

5. The method of claim 1, wherein the process specific templates are accessible only by a peer process instance have a specified role.

6. The method of claim 1 further comprising, maintaining at each CPM a mapping table between cooperation keys and a local process instance identifier.

7. The method of claim 1 further comprising, employing a queuing technique at the out-of-order message handler to resolve out-of-order message delivery problems.

8. The method of claim 1 wherein the CBP includes a plurality of tasks, the method further comprising:

the first CPM receiving a current task;

the first CPM determining if the current task is responsibility of the first CPM;

when the current task is the responsibility of the first CPM, executing the current task; and when the current task is not the responsibility of the first GPM, not executing the current task.

9. The method of claim 1 further comprising, employing task return messages for synchronizing the peer process instances and for exchanging data between the process instances; wherein each task return message includes:

a cooperation key for specifying a logical process instance;

a local handle of the process instance and task;

an activity execution status; and a sub-packet of process data passed to a task.

* * * * *

UNITED STATES PATENT AND TRADEMARK OFFICE

CERTIFICATE OF CORRECTION

PATENT NO. : 7,236,939 B2
APPLICATION NO. : 09/823581
DATED : June 26, 2007
INVENTOR(S) : Qiming Chen et al.

It is certified that error appears in the above-identified patent and that said Letters Patent is hereby corrected as shown below:

In column 10, line 44, delete “WorkNodel” and insert -- WorkNode1 --, therefor.

In column 16, line 39, in Claim 8, delete “GPM” and insert -- CPM --, therefor.

Signed and Sealed this

Fifth Day of May, 2009

JOHN DOLL

*Acting Director of the United States Patent and Trademark Office*